United States Patent [19]

Bovio et al.

[11] 4,428,693

[45] Jan. 31, 1984

[54] SERIAL DOT PRINTER FOR OFFICE MACHINES

[75] Inventors: Michele Bovio, Brosso; Lino Sella, Banchette; Pierangelo Berruti, Chivasso; Walter Gillone, Ivrea; Luciano Ceresa, Albiano, all of Italy

[73] Assignee: Ing. C. Olivetti & C., S.p.A., Ivrea, Italy

[21] Appl. No.: 328,257

[22] Filed: Dec. 7, 1981

Related U.S. Application Data

[62] Division of Ser. No. 245,528, Mar. 19, 1981, abandoned.

[30] Foreign Application Priority Data

Mar. 20, 1980 [IT] Italy .............................. 67417 A/80
Feb. 2, 1981 [IT] Italy .............................. 67134 A/81

[51] Int. Cl.³ .......................... B41J 3/02; B41J 25/30; G01D 15/18

[52] U.S. Cl. ................................ 400/126; 346/140 R; 400/320; 400/328

[58] Field of Search ............... 400/126, 320, 322, 328; 346/140 PD

[56] References Cited

U.S. PATENT DOCUMENTS

| | | | |
|---|---|---|---|
| 3,787,884 | 1/1974 | Demer | 346/75 |
| 3,820,121 | 6/1974 | Rich et al. | 346/140 R |
| 3,898,671 | 8/1975 | Berry et al. | 346/75 |
| 3,905,463 | 9/1975 | Boyce et al. | 400/124 |
| 3,945,022 | 3/1976 | Distler | 346/75 |
| 4,084,681 | 4/1978 | Heinzl et al. | 400/126 X |
| 4,127,334 | 11/1978 | Watanabe et al. | 400/124 |
| 4,259,026 | 3/1981 | Hanaoka et al. | 400/320 X |
| 4,332,487 | 6/1982 | Bovio et al. | 346/140 PD |

*Primary Examiner*—Paul T. Sewell
*Attorney, Agent, or Firm*—Schuyler, Banner, Birch, McKie & Beckett

[57] ABSTRACT

The printer comprises a solid or liquid ink jet head 100 arranged to print open dot at a time on paper running over a platen 80. The head is carried by a carriage 48 movable transversely with simple harmonic reciprocating motion. In order to reduce the effect of inertial forces when the carriage reverses its movement, the drive is effected by an eccentric peg 70 on a disc 276, the peg engaging in a guide slot 54 of the carriage perpendicular to the direction of reciprocation. An eccentric cam track 71 in the disc engages a peg 92 on a counter-weight 90 for counterbalancing the inertial forces of the carriage. In order to synchronize the printing operation with the carriage movement, an optical strobe disc 258 is rigid with the disc 276 and has slots 258 disposed at a pitch varying according to the harmonic motion. The platen 80 is rotated intermittently by a helical cam 277 carried by the disc 276 and a peg wheel 280, 281. In order to compensate for discharge of a smoothing or reservoir circuit feeding the printing head 100, the duration of the pulses applied thereto can be increased in accordance with the rate at which dots are being printed. In a modification the strobe disc is replaced by a linear transducer of capacitive type, with one part carried by the carriage.

8 Claims, 14 Drawing Figures

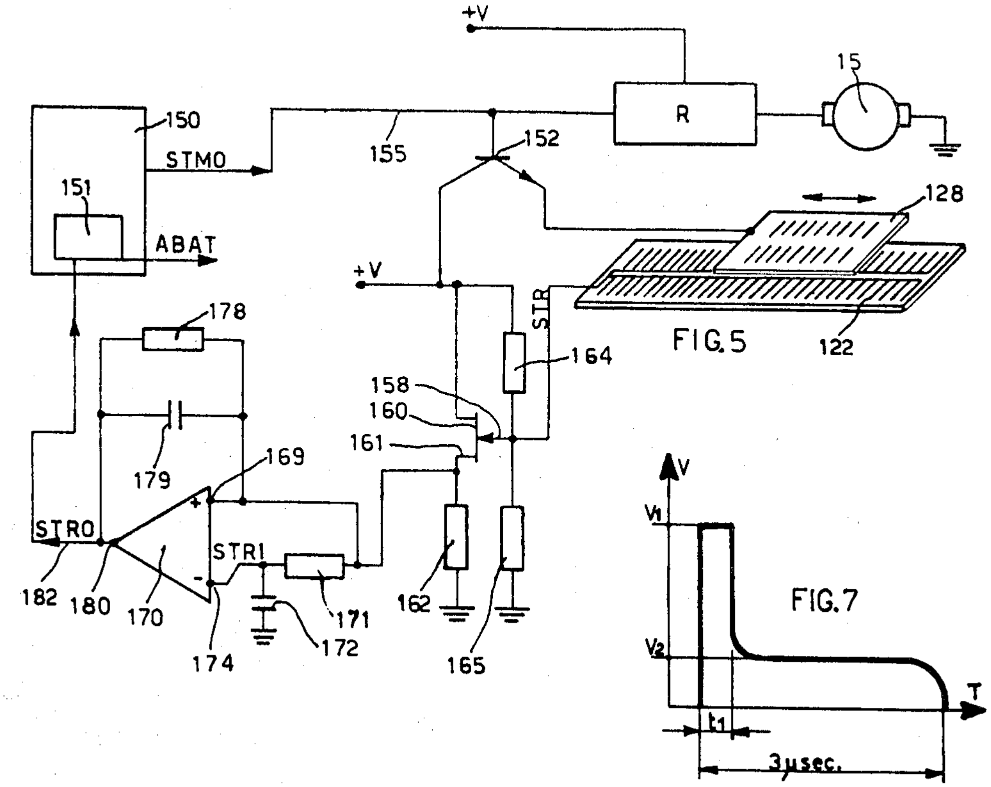
FIG.5
FIG.7
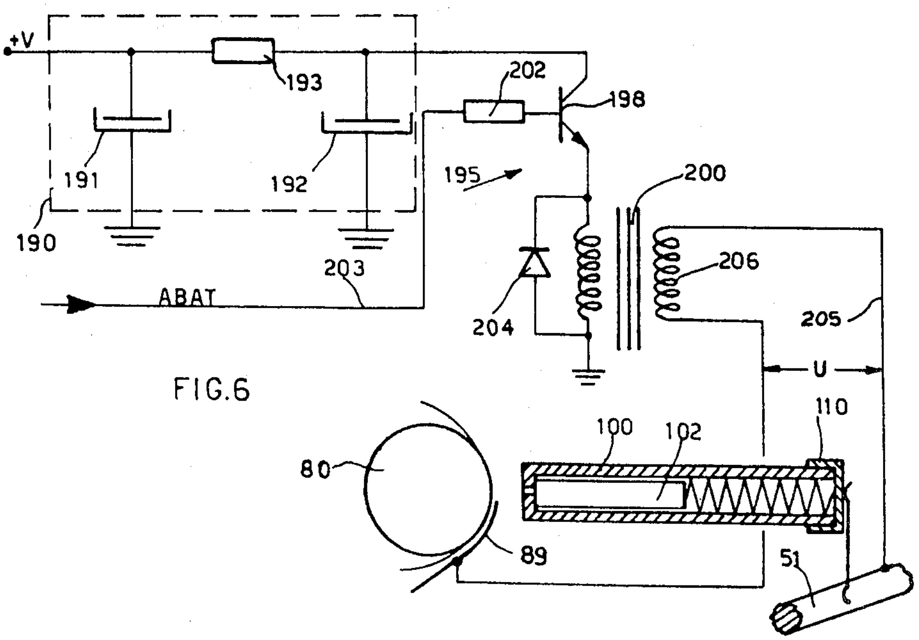
FIG.6

96
110
317
51
318
316
60
90
15
278
277
256
B
258B
258
250
264
66'
66
100
48
96
316
70
A
95
89
258
281
80
81
284
285
37
280
283
282
50
51
318
IX

SERIAL DOT PRINTER FOR OFFICE MACHINES

This a division of application Ser. No. 245,528, filed Mar. 19, 1981, now abandoned.

This invention relates to a serial dot printer comprising a carriage movable transversely relative to the paper, and carrying at least one printing head which can be actuated selectively in order to print in a series of printing positions on the paper, and eccentric means for moving the carriage with harmonic motion.

So-called "serial-parallel" dot printers are know, in which the carriage carries a plurality of printing heads and is moved with reciprocating movement in order to allow each printing element to print the dots of one or more characters. As the carriage stroke is very short, it has already been proposed to move the carriage by means of an eccentric. In order to reduce the cost of printers, for example for computers, it is advantageous to drastically reduce the number of printing heads and in the limit to have a single printing element which moves over the entire width of the paper. The carriage movement must then take place at high speed, because of which inertial forces are created on movement reversal.

The object of the invention is to provide a serial printer, in which the effect of the inertial forces at the movement of reversal is drastically reduced.

This problem is solved by the printer according to the present invention, which is defined by the features set out in the characterising part of claim 1.

The invention will be described in more detail, by way of example, with reference to the accompanying drawings, in which:

FIG. 5 is the diagram of the synchronisation circuit;

FIG. 6 is the diagram of the printer operating circuit;

FIG. 7 is a diagram of a high voltage pulse generated by the circuit of FIG. 6;

Figures 1, 4:
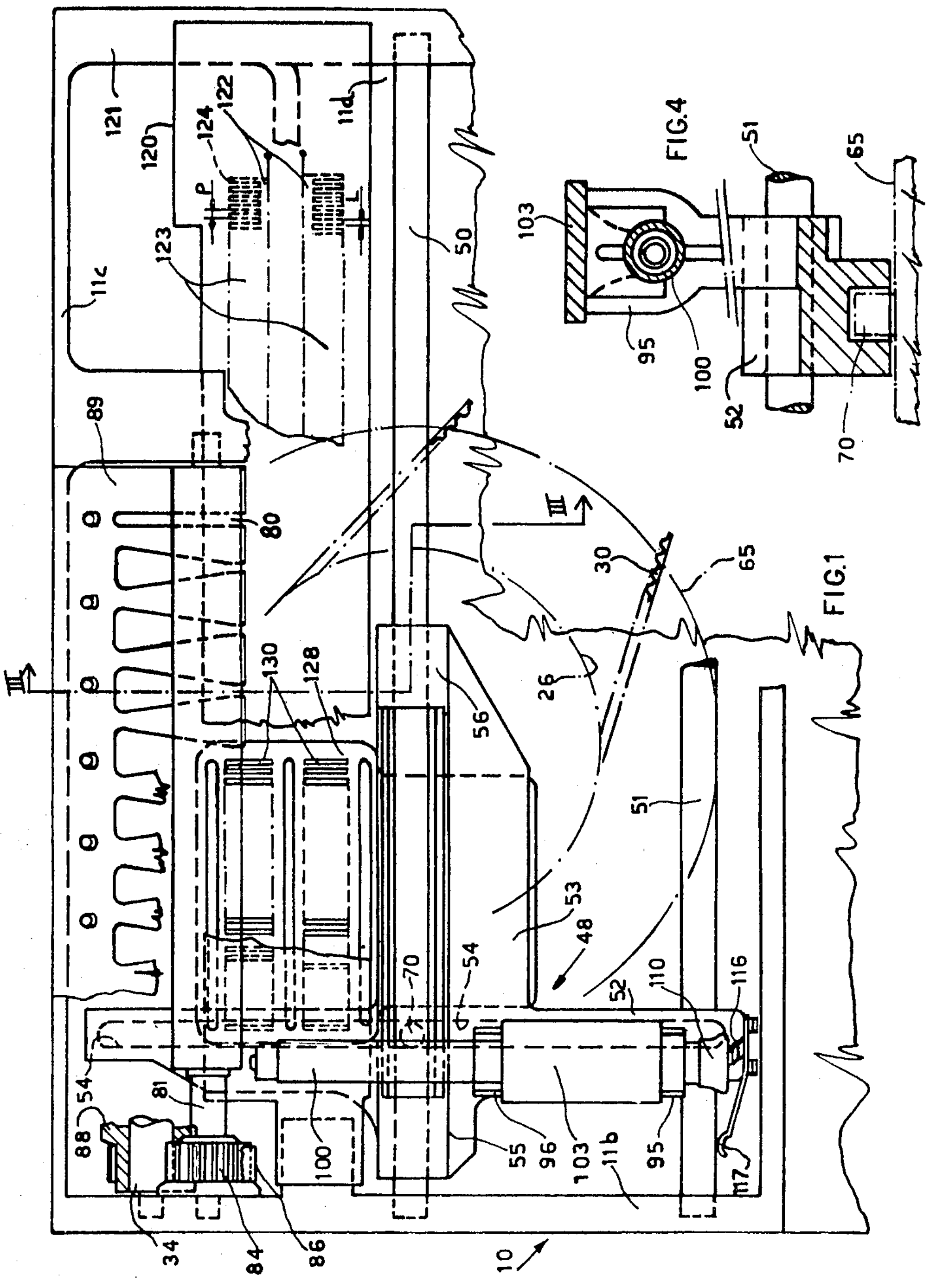
FIG. 1 is a partial plan view of a first embodiment of the printer according to the invention.
FIG. 4 is a section on the line IV—IV of FIG. 3.

With reference to FIG. 1, a container 10 of substantially parallelepiped box form having four side walls 11*a*–11*d* and a base wall 12 (FIG. 3) encloses all the component parts of the printer embodying the invention, in the manner described in detail hereinafter.

A D.C. motor 15 is contained in a housing 16, with its axis of rotation disposed vertically. A cover 20 closes an aperture in the base wall, by way of which access can be gained to the inside of the container 10 from below. A vertical shaft 22 is formed integrally with the cover 20 and on its there rotates a pulley 23 formed from a hub 24 and two cylindrical parts 25 and 26 connected rigidly to the hub 24 by spokes 27.

A thread 28 of variable pitch is provided on the cylindrical part 25, while on the cylindrical part 26 there is provided straight toothing 29 in which a toothed belt 30 engages. The belt 30 also engages with a sprocket 31 keyed on to a shaft 32 of the motor 15.

Figure 2:
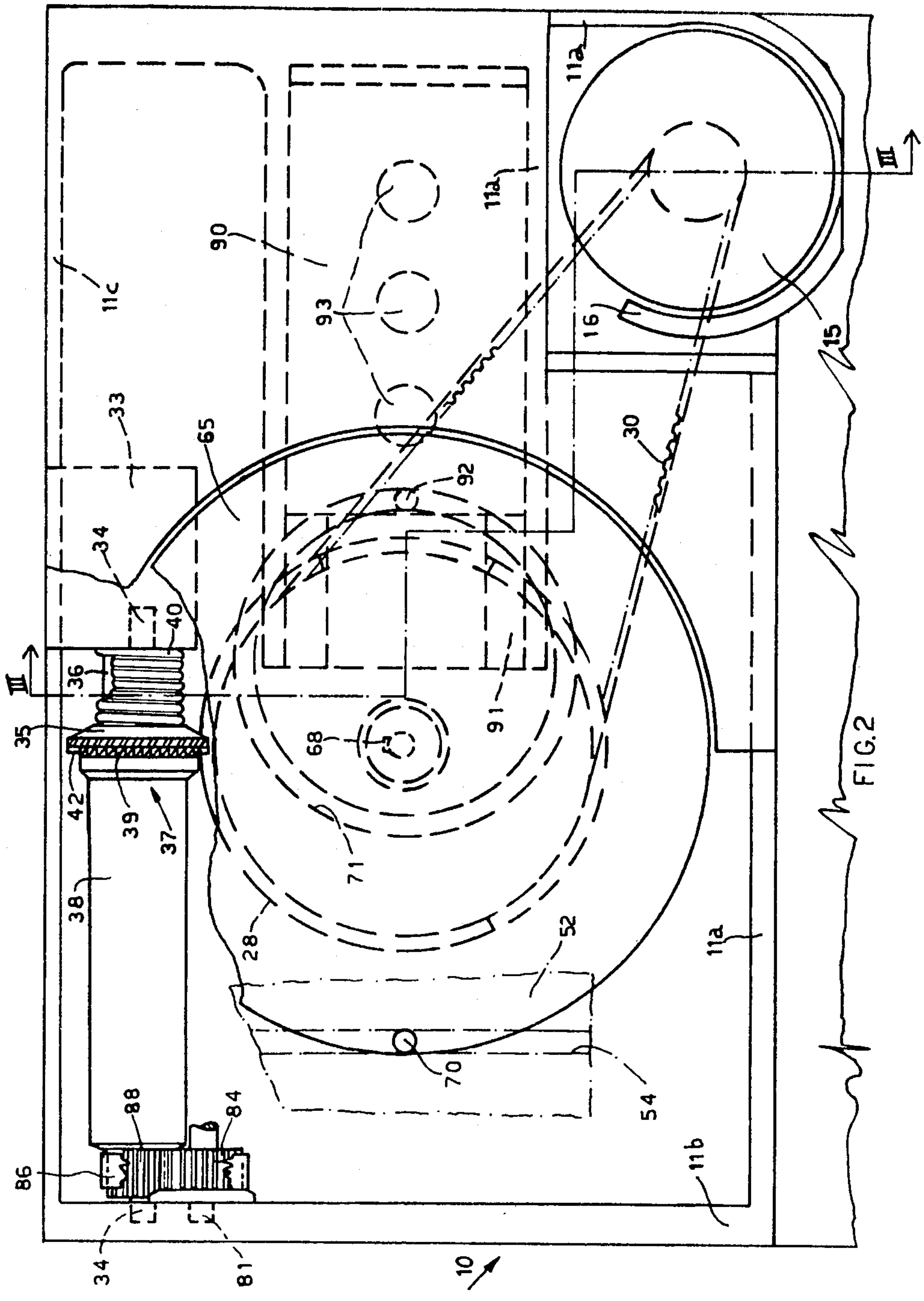
FIG. 2 is a further partial plan view of the printer of FIG. 1.

On internal projections 33 (FIG. 2) of the container 10 there rotates a splined shaft 34 with a horizontal axis, on which a helical gear 35 which engages with the thread 28 can slide but not rotate.

Figure 3:
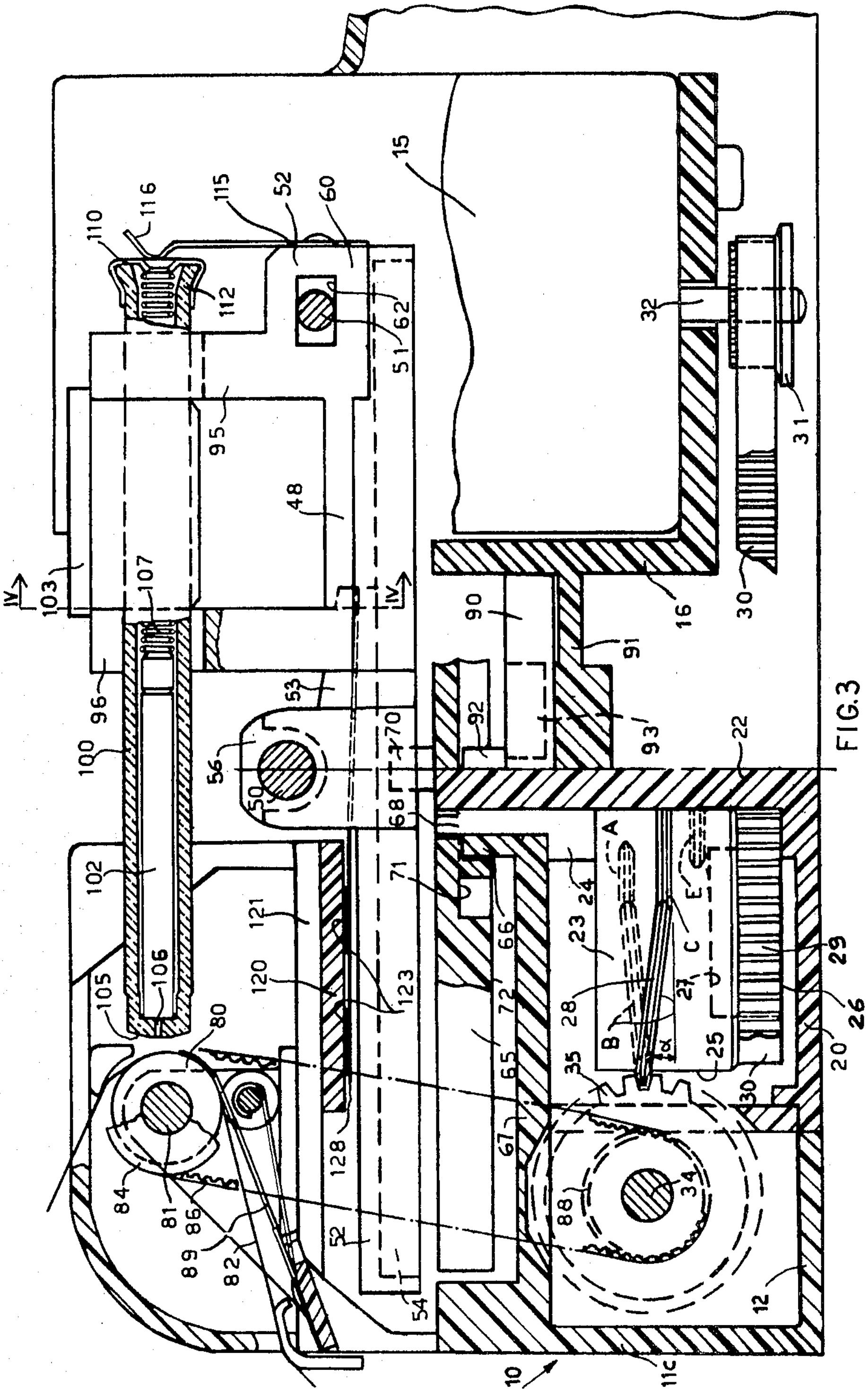
FIG. 3 is a section on the line III—III of FIGS. 1 and 2 to an enlarged scale.

FIG. 3 shows the development of the thread 28 in a position relative to the helical gear 35 which corresponds to that of FIG. 1. The thread 28 is constituted by a single turn which begins with a portion A of zero inclination, followed by a portion B having an inclination $\alpha$, for example 2°10′, a portion C of zero inclination, a portion D (not shown) of inclination equal to the angle $\alpha$, and a portion E of zero inclination.

The gear wheel 35 is provided with a hub 36, and constitutes the drive part of a unidirectional clutch 37, of which a cylindrical element 38 is the driven part. The driven element 38 is provided with frontal toothing 39 with teeth having a triangular profile of unequal sides which engage, under the action of a spring 40 coaxial to the hub 36, with complementary toothing 42 of the wheel 35.

A carriage 48 (FIG. 1) can slide on two cylindrical parallel guides 50 and 51 fixed at their ends to the opposite side walls 11*b* and 11*d*. The carriage 48 is formed from a lower member 52 which is of elongated shape in a direction transverse to the guides 50 and 51, and is rigidly connected to a support 53 elongated in a direction parallel to the guide 50 and 51. In the lower member 52 of the carriage 48 there is provided a rectilinear slot 54, of which the longitudinal axis is perpendicular to the guides 50 and 51, whereas the support 53 is rigid with two slide blocks 55 and 56 slidable on the guide 50. An aperture 62 in which the guide 51 passes is provided at one end 60 of the lower member 52.

A disc 65 (FIGS. 2, 3) rotates on the free upper end of the shaft 22, supported by a collar 66 forming part of a rib 67 inside the container 10 and originating from the wall 11*c*. The disc 65 is rotated by the hub 24, which is coupled to the disc 65 by two pegs 68 rigid with the hub 24.

A peg 70 with a vertical axis is fixed to the disc 65 near to its outer edge and engages in the slot 54, because of which the carriage 48 reciprocates along the guides 50 and 51 by virtue of the rotation of the disc 65. In particular, if the disc 65 rotates at constant angular speed, the carriage 48 reciprocates with a speed which varies sinusoidally, in known manner, ie with simple harmonic motion.

A circular slot 71 is provided in the lower face 72 of the disc 65, and is offset to an eccentric position diametrically opposite the peg 70.

A platen or roller 80 (FIGS. 1, 3) of material having a high coefficient of friction, for example rubber, is rigid with a shaft 81 rotatable in the container 10. The roller 80 supports and entrains a strip 82 of plain paper or printing support on which the printing is to be effected. On the shaft 81 is keyed a toothed pulley 84 about which a toothed belt 86 is entrained. The belt is also entrained round a toothed pulley 88 keyed rigidly on to the shaft 34.

A resilient metal strip 89 is fixed to the wall 11*c*, and partly wraps about the platen 80 in order to guide and press the paper against the platen 80 and constitute an electrode in the manner described hereinafter.

A slider 90 slides on guides 91 rigid with the walls 11*a* and 11*d* of the container 10. The slider 90 is provided with a peg 92 engaged in the groove 71. The slider 90 is also provided with additional masses 93, constituted by lead blocks, in order to balance the action of the mass of the carriage 48 on the disc 65, by which means the inertial forces generated by the fast reciprocating strokes of the carriage 48 are counterbalanced.

In the top of the carriage 48 there are fixed two forks 95 and 96 (FIGS. 3, 4) in which a tube 100 of heat-resistant insulating material, for example glass, quartz, a ceramic material or a heat-resistant resin is gripped. The tube 100 is positioned perpendicular to the platen 80, and contains a cylindrical bar 102 of ink composed of a solid mixture of powdered graphite and a resin binder as described in our published British Patent Application No. 2,014,514. The end wall 105 of the tube 100 facing the platen 80 has a small diameter bore 106. The bar 102 is kept pressed against the end wall 105 by a metal spring 107 retained by a metal cap 110 fixed so that it closes the other open end 112 of the tube 100.

A left spring 115, fixed to the carriage 48, has two resilient arms 116 and 117 disposed perpendicularly to each other, so that the arm 116 presses on to the cap 110 and the arm 117 slides on the guide 51 in order to electrically connect the ink bar 102 to the metal guide 51. In order to be able to easily replace the tube 100 when its ink has run out, a grip 103 in the form of a plastics saddle of length equal to the distance between the forks 95 and 96 and insertable between them, is fixed on to the tube 100 in a central position.

A printed circuit board 120 (FIG. 1), fixed to a rib 121 of the container 10, carries on its lower face a conducting track 122 in the form of a double comb, constituted by a pair of longitudinal strips 123 parallel to the direction of movement of the carriage 48. A plurality of arms 124, spaced equally apart by a pitch P branch perpendicularly from each strip 123. The width L of each arm is equal to P/2. The two strips 123 are connected together electrically in parallel. The track 122 is covered by a thin layer of electrically insulating varnish very resilient to wear.

A metal blade 128 is fixed to the carriage 48, lies against the track 122 and slides on it during the stroke of the carriage 48, but without being in electrical contact with the track 122. The blade 128 is provided with two facing groups of parallel rectangular slots 130 disposed so that each group of slots covers the corresponding strips 123 of the track 122. The slots are spaced apart by a distance equal to the pitch P of the track 122.

Consequently, the blade 128 and track 122 constitute the plates of a capacitor, the capacitance C of which varies between a minimum value and a maximum value, the minimum value being obtained when a slot 130 faces a transverse arm 124 of the track 122, while the maximum value is obtained when a slot 130 is exactly between two adjacent arms 124 of the track 122. It follows that during each outward and return stroke of the carriage 48, the capacitance C varies between the minimum and maximum value as many times as the ratio between the length of the carriage stroke and the pitch P of the track 122, so that each stroke of the carriage can be divided into a succession of equidistant positions in which the capacitance C is a maximum, interspaced by positions in which the capacitance C is a minimum.

By means of a capacitance detector 160, 170 (FIG. 5), a signal STRO is detected each time the capacitance C is a maximum. Consequently, the signal STRO can be used as an activation signal for the printing device, as the signal STRO occurs at successive positions of the carriage 48 equidistant by a pitch P. It follows that the signal STRO is always generated at positions of the carriage 48 which are fixed relative to the printing platen 80, in a manner independent of the speed of rotation of the motor, and of any accidental irregularities in the carriage movement due to friction, play in the couplings and/or wear of the parts in relative motion.

FIG. 5 shows in some detail the circuit for measuring the capacitance of the variable capacitor formed by the moving blade 128 and track 122. A control unit 150 controls all the functions necessary for the operation of a computer. This control unit is not described in detail because it is of known type and its structure does not form part of the present invention. For clarity of description, it will be stated only that the control unit 150 comprises a print buffer 151 in which all the characters of a line to be printed are stored as they occur, and are fed to the printer broken down serially into the dots of successive elementary lines of dots, according to the type of matrix chosen. In the present case, a 5×7 matrix is used, so that the head 100 successively prints the dots of all the characters of each elementary line for seven consecutive strokes in both directions, and at the end of each stroke an elementary line spacing is carried out.

The movable blade 128 is connected to a D.C. voltage source +V, by way of a transistor 152 which acts as a switch. The base of the transistor 152 is connected to the control unit 150 by a conductor 155 over which the unit 150 feeds a binary signal STMO. The track 122 is connected to a control electrode 158 of a seminconductor device 160, for example a field effect transistor which acts as an amplifier for the signal STR at the control electrode 158. The source electrode 161 is connected to earth through a resistor 162, and the drain electrode is connected to the voltage source +V. The control electrode 158 is also connected to the intermediate point of two resistors 164, 165 in series, which are connected between +V and earth. The source electrode 161 is connected directly to the non-inverting input 169 of a comparator amplifier 170, while an integration network, composed of a resistor 171 and a capacitor 172, is connected between the source electrode 161 and the inverting input 174 of the amplifier 170. A feedback network, formed from a resistor 178 in parallel with a capacitor 179, is connected between the output 180 and input 169 of the amplifier 170 in order to reduce the pass band frequency of the amplifier 170. The output 180 of the amplifier 170 is connected to the control unit 150, to transfer to it over a conductor 182 a signal STRO corresponding to the signal STR suitably amplified and squared by the amplifier 180, as described in detail hereinafter.

The signal STMO is also fed to a voltage regulator circuit R of known type, which supplies the motor 15. The voltage source +V (FIG. 6) is connected to a pi smoothing filter 190, formed from two large capacitors 191, 192 and a resistor 193 for supplying a high voltage generator 195. A transistor 198 has its collector connecting to one terminal of the capacitor 192 and the emitter connected to one end of the primary winding of a step-up transformer 200, the transformation ratio of which is 1:200. The other end of the primary winding of the transformer 200 is connected to earth. The base of the transistor 198 is connected through a current limiting resistor 202 to the control unit 150 by way of a conductor 203, over which the buffer 151 feeds a signal ABAT to activate the transistor 198 in the manner described hereinafter. A diode 204 is connected in parallel with the primary of the transformer 200 to short-circuit any negative voltages across its ends. The transformer 200 has a secondary winding 206, the ends of which are connected to the cylindrical guide 51 and to the paper pressing electrode 89 respectively.

The operation of the printer is as follows. When the print buffer has been loaded with the characters of one line of print, the unit 150 feeds through the wire 155 a logic signal STMO=1. The transistor 152, normally blocked, is activated, and the voltage +1 is applied to the movable blade 128. The semiconductor device 160 is biased by the resistors 162, 165 to operate as a linear amplifier. At the same time, the voltage regular R is made active by the signal STMO and causes the motor 15 to rotate at a speed such as to rotate the pulley 23 (FIG. 3) at 20 revolutions/sec., which by means of the hub 24 and peg 68 rotates the disc 65, which by means of the peg 70 causes the carriage 48 to reciprocate along the guides 50 and 51 with simple harmonic motion.

Because of the effect of the relative movement between the blade 128, rigid with the carriage 48, and the track 122, the capacitance C varies sinusoidally; here there is a sinusoidal signal STR across the high value resistor 165 of variable amplitude, but of which the maximum values correspond unequivocally to precise and repeatable positions of the carriage 48 relative to the printing platen 80.

The sinusoidal signal STR is then transferred by way of the semiconductor 160 from the high impedance circuit formed by the variable capacitor 128, 122, to a low impedance circuit formed by the comparator amplifier 170. The signal STR is thus applied directly to the non-inverting input 169 of the comparator amplifier 170, while at the inverting input 174 a signal STRI (FIG. 5) is applied, taken from the output of the integrator circuit 171, 172.

The comparator 170 compares the signal STR present at the terminal 169 with its means value obtained at the terminal 174, to give at the output 180 a signal STRO which is preferably square and in phase with the maximum levels of the signal STR. The signal STRO is fed through the conductor 182 to the print buffer 151 to synchronise the signal ABAT for authorising the printing of each individual dot of a line. The signal STRO is also used in known manner by the unit 150 for deactivating the signal ABAT during the return stroke of the carriage after printing the 7th elementary line, during which line spacing of the paper takes place. The signal ABAT is used in the high voltage generating circuit of FIG. 6, and is constituted by a voltage pulse (FIG. 7) having a duration of 3 μsec, and an amplitude such as to cause the power transistor 198 to conduct. This supplies the primary of the transformer 200 with a high intensity current pulse supplied by the capacitor 192. Correspondingly, through the wire 205 which connects the secondary 206 to the guide 51, a negative voltage pulse U is generated having a maximum amplitude of the order of 1500 to 2000 V, and a total duration of 3 μsec, which after ionising the dielectric constituted by the air between the end 105 and the electrode 89, triggers an arc between the front end of the solid ink cylinder 102 and the paper pressing electrode 90, through the nozzle 106. The combined action of the electric arc and the consequent high temperature created in a restricted zone at the front end of the solid ink cylinder 102 causes an erosion of solid ink particles and their partial sublimation and combustion. This phenomenon produces in its turn a rapid increase in the gas pressure at the inner mouth of the nozzle 106, which violently expels the mixture of gas and still solid ink particles through the nozzle itself, in an axial direction independently of the path of the electric arc in the external portion between the nozzle and electrode 90, in order to form a dot on the paper 82.

The form of the voltage pulse U determined by means of an oscilloscope confirms this explanation. In this respect, the voltage pulse U has the form indicated in FIG. 7, in which on a time (T)-voltage (V) diagram, $V_1$ is the maximum value attained by the voltage V during the ionisation of the dielectric for a time $t_1$ of the order of 0.5–1.5 μsec, and $V_2$ is the voltage established after the arc has been stuck, namely of the order of 300–400 V. The voltage drop after the time $t_p$ is caused by the passage of the arc current in the impedance of the secondary winding 206.

In the second embodiment of the invention, the peg 70 (FIG. 8) which engages the carriage slot 54 is carried by a disc 276 rortatable about a vertical axis, and is connected to the counterweight 90 to balance the carriage inertial forces.

Figures 8, 10:
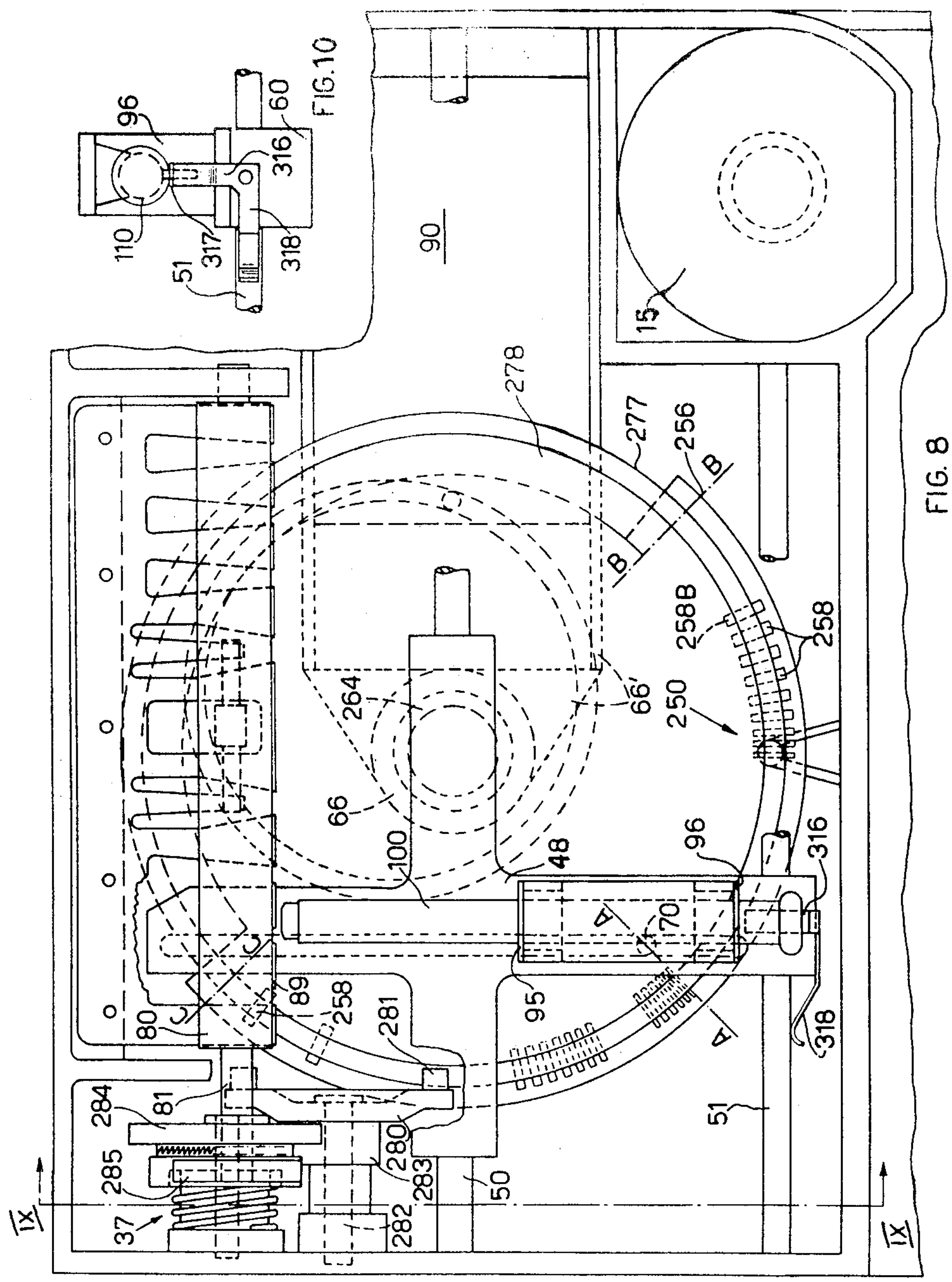
FIG. 8 is a partial plan view of another embodiment of the printer according to the invention.
FIG. 10 is a front view of a detail of the printer of FIGS. 8 and 9.
Figure 9:
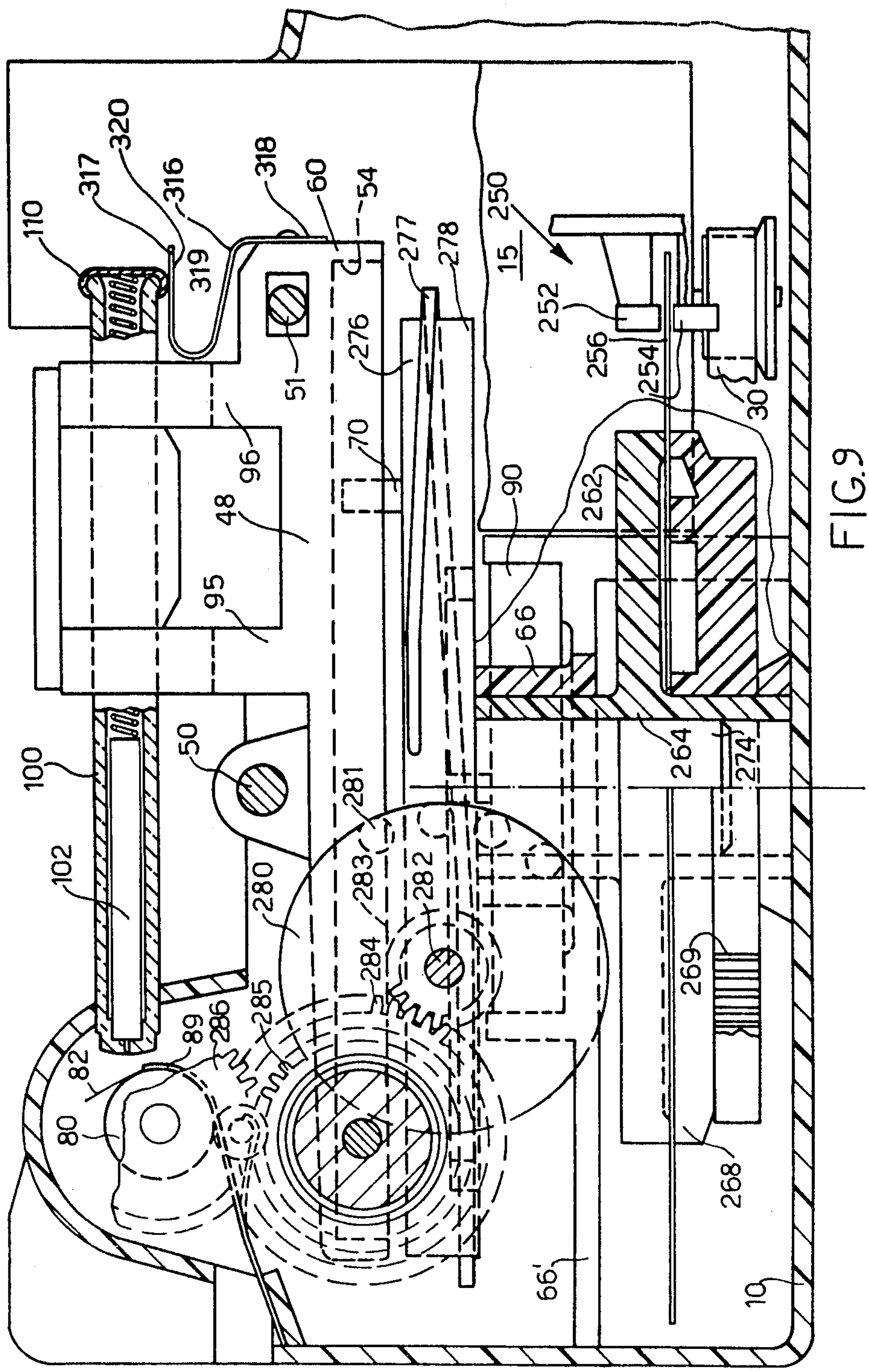
FIG. 9 is a section on the line IX—IX of FIG. 8.

The printing head is operated by a strobe signal STR obtained by an optical transducer 250 (FIGS. 8 and 13) constituted by a light emitting diode 252, a phototransistor 254 and a strobe disc 256 provided with slots 258 near its periphery. The strobe disc 256 is fixed to a wheel 262 provided with a hollow hub 264 (FIG. 9) and rotatable on a bush 66 in one piece with a horizontal rib 66' of the fixed frame 10 (FIG. 8). A backing disc 268 is a tight press fit on the hub 264 (FIG. 9) in order to lock the strobe disc 256. The backing disc 268 is provided on its bottom with a ring gear 269 with which there engages the toothed belt 30 for transmitting the rotation of a continuously rotating electric motor 15 to the wheel 262.

Inside the hollow hub 264 there is mounted a pin 274 rigid with a disc 276 provided with a scroll or thread 277 on its lateral surface 278. The scroll 277 engages with a wheel 280 comprising front pages 281 and which rotates on a shaft 282 parallel to the printing roller 80. The wheel 280 transmits motion to the platen 80 by way of two pairs of gears 283, 294, 285 and 286, of which the gear 286 is connected to the shaft 81 of the platen 80 by way of a unidirectional clutch 37.

Figure 13:
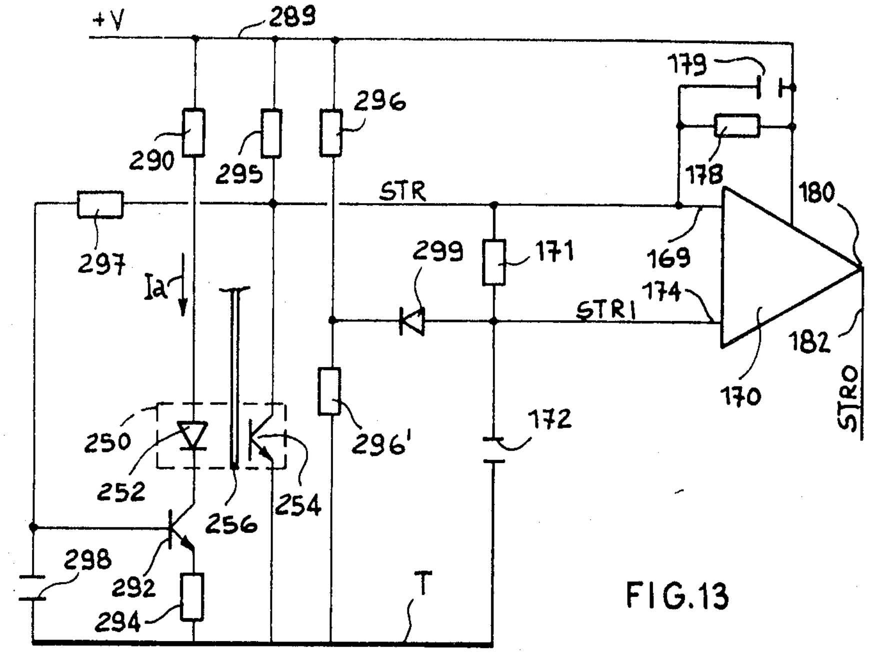
FIG. 13 is an electrical diagram of the synchronisation circuit.

FIG. 13 shows a circuit for detecting the strobe signal STR generated by the passage of the slots 258 of the disc 256 in front of the light emitting diode 252. The diode 252 is supplied by a direct current derived from a line 289 at a D.C. voltage of +V, by way of a resistor 290, a transistor 292 and a limiting resistor 294 connected in series between the line 289 and earth T. As is well known, because of manufacturing tolerances, the diode 252 can require different current values to emit the same light intensity. In order to compensate this tolerance, a feed-back circuit is used, connected between the collector of the transistor 254 and earth T, and formed from a resistor 297 in series with a filter capacitor 298, of which the common point is connected to the base of the transistor 292. In this respect, when the diode 252 emits less light for a predetermined current Id, the phototransistor 254 conducts to a lesser degree, so that the voltage drop across the resistor 295 is less than the rated drop. Consequently, the transistor 292 is biased more positively, and the current Id increases.

The strobe signal STR is taken from the collector of the transistor 252 and is fed to a comparator circuit 170 to compare it with the mean value of the signal indicated by STRI and provided between a resistor 171 and integrating capacitor 172. The circuit of FIG. 13 also comprises a bias network for the inverting input 174 of the comparator 170, formed by a resistive divider 296, 296' and a diode 299, in order to maintain the D.C. voltage of the input 174 at a value less than the voltage +V, and to eliminate possible voltage peaks present across the resistor 171.

Because the carriage 48 (FIG. 9) moves transversely with harmonic motion, in order to ensure a constant pitch between the dots of the character matrix of a line of print it is necessary for the repetition frequency of the pulses of the signal STRO to follow the same relationship as the movement of the carriage 48. In other words, as the carriage travels through increasingly longer spaces per unit of time, the strobe pulses must follow them more rapidly. For this purpose, the slots 258 in the disc 256 (FIG. 8) are spaced apart by a pitch which varies with a sinusoidal relationship, so that on rotating the disc 256 at a constant speed, for example, the signal STRO is generated successively at a succession of positions of the carriage 48 which are equidistant along a line of print. If printing is carried out only along one of the two paths of travel of the carriage 48, the slots are disposed along a circular arc having an extent not exceeding 180°. In the embodiment of FIG. 8, the slots 258 are disposed along an arc of 140° 30', symmetrically about a line A—A disposed in a position corresponding with the photodiode 252, when the carriage 48 is exactly at the centre of its stroke. When the carriage 48 is at the end of its right hand or left hand stroke, the disc 256 brings a line B—B or C—C respectively, perpendicular to the line A—A, into a position corresponding with the diode 252. The end slots 258B, 258C are at an angle of 19° 45' to the line B—B in that the end parts of the stroke of the carriage 48 are excluded for the line of print.

Figure 12:
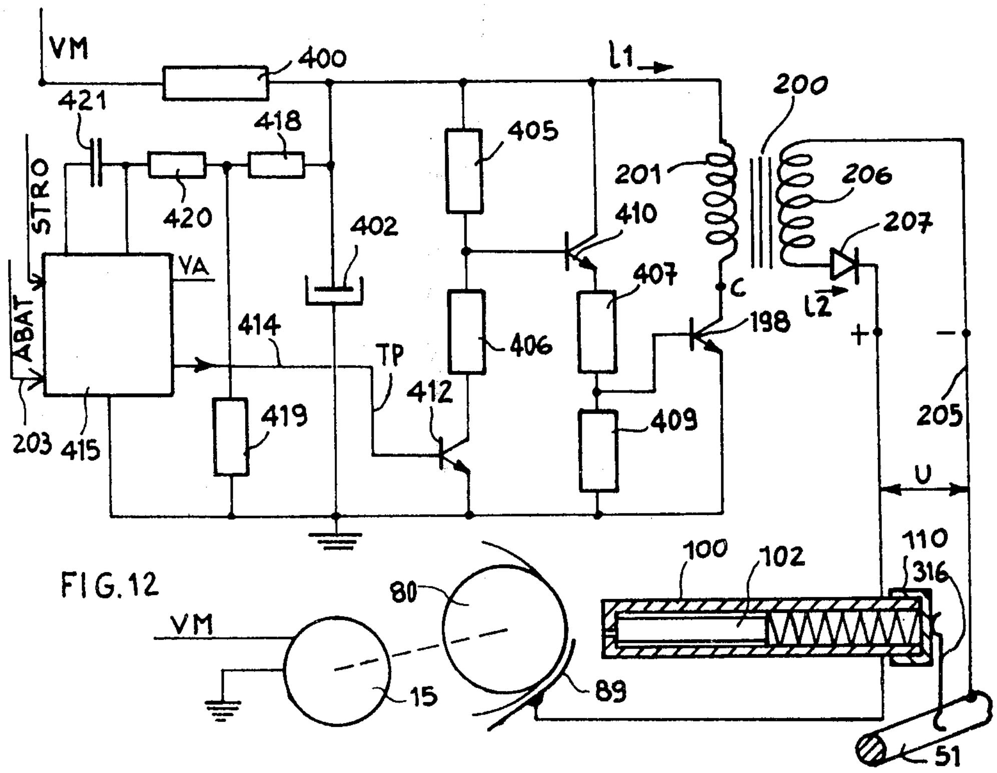
FIG. 12 is an electrical diagram of the corresponding printer operating circuit.

In order to make the insertion of the head tube 100 between the two resilient forks 95, 96 easier, a leaf spring 316 (FIGS. 8 and 9) is provided, fixed to the ends 60 of the carriage 48 and formed with two arms 317, 318 (FIG. 10) perpendicular to each other. The arm 317 is bent to form a loop 319 (FIG. 9) and a straight portion 320 lying below the metal cap 110, while the bent end of the arm 318 (FIG. 8) is forced resiliently against the metal guide 51 (FIG. 12) connected to the high voltage generator, to constitute a sliding contact. When the tube 100 is inserted between the forks 95, 96, the cap 110 comes into contact with the portion 320 of the spring 316.

Figure 11:
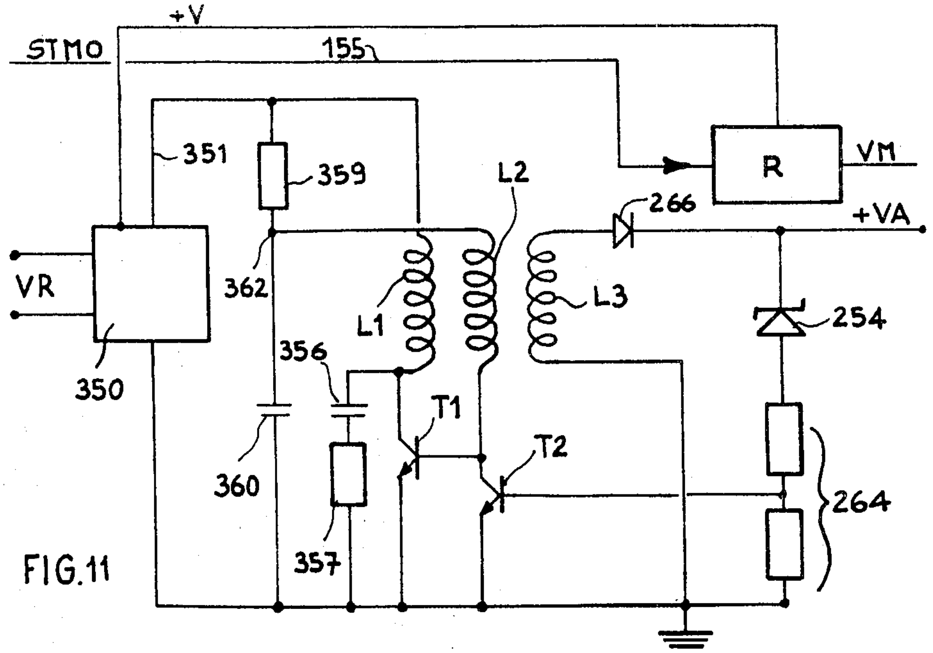
FIG. 11 is an electrical diagram of the supply circuit for the printer of FIGS. 8–10.

The supply circuit is of the stablised switching type, and comprises a rectification and smoothing circuit 350 (FIG. 11) for rectifying an alternating main voltage VR and supplying a first positive D.C. voltage +V. This is applied to the voltage regulator R to generate a supply voltage VM for the motor 15.

The rectifier 350 also generates along a wire 351 a second positive D.C. voltage applied to an inductance $L_1$ in series with the collector of a transistor $T_1$, of which the emitter is connected to earth. A capacitor 356 and resistor 357 are connected in parallel to the transistor $T_1$. Between the wire 351 and earth there are connected a resistor 359 and a capacitor 360, the common point of which is connected to one terminal of an inductance $L_2$, inductively coupled to $L_1$. The other terminal of $L_2$ is connected to the base of the transistor $T_1$ and to the collector of a transistor $T_2$, the emitter of which is connected to earth. A third inductance $L_3$, inductively coupled to $L_2$, is connected between earth and an output terminal +VA by way of a diode 266.

A Zener diode 254 in series with a resistive divider 264 is connected between the output +VA and earth, and the intermediate point of the divider 264 is connected to the base of $T_2$. The components 359, 360, $L_1$, $T_1$, 356 and 357 constitutes the oscillator of the switching power supply unit, while $L_2$ controls the transistor $T_1$ to maintain the frequency of the oscillator 359, 360, $L_1$ stable.

The inductance $L_3$ together with the corresponding components 254, 264 and $T_2$ provide a feedback for the output to ensure stability of the output voltage +VA which is used for supplying all the circuits of the serial printer.

The voltage VM (FIG. 12) is also fed through a resistor 400 to the terminals of a capacitor 402, which is of large capacity in order to supply an adequate current to the primary 201 of the transformer 200 of a high voltage pulse generator circuit for operating the printing head 100. The transistor 198 is connected in series with the primary 201, and has its emitter connected to earth, for the purpose of interrupting the primary circuit of the transformer 200. The purpose of the network constituted by four resistors 405, 406, 407, 409 and two transistors 410, 412 is to raise the power of the signal fed to the base of the transistor 198 relative to the signal TP emitted along a wire 414 by a monostable multivibrator 415. The monostable multivibrator 415 is activated by a signal STRO emitted by the comparator 170 (FIG. 13) when the signal STR exceeds the mean value STRI, in order to transfer through the wire 414 a signal ABAT generated by a print buffer 151 of the central unit of the machine.

Figure 14:
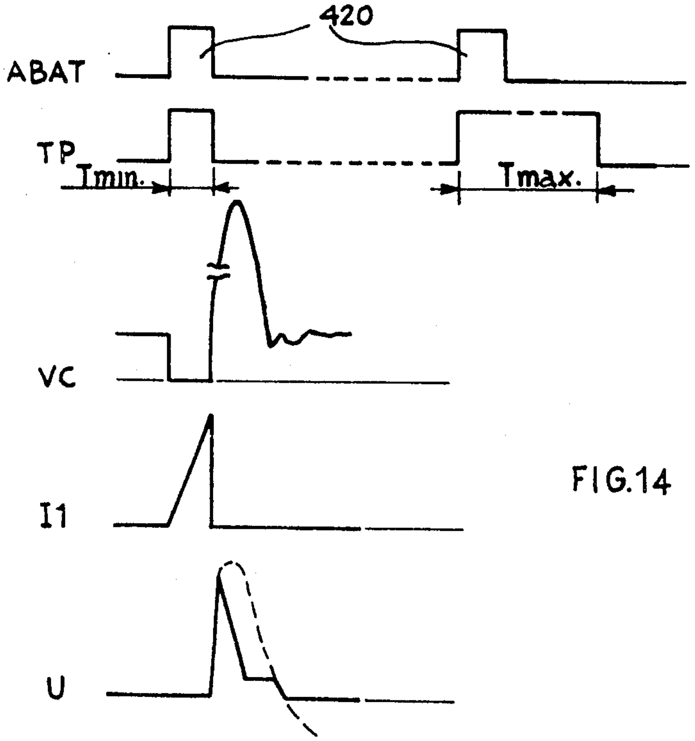
FIG. 14 is a digram illustrating some electrical signals of the printer of FIGS. 8–13.

The signal ABAT is constituted by a pulse (FIG. 14) having a duration of 1 to 3 μsec, and is emitted by the buffer 151 (FIG. 12) on printing each dot.

In order to maintain the black intensity of the printed dots constant, the energy supplied to the ink bar 102 of the printing head must be kept constant. When a large number of dots have to be printed close together in succession, the voltage across the capacitor 402 falls, and consequently the current supplied to the primary winding 201 falls. To compensate for the reduction in current, a fraction of the voltage is branched from the capacitor 402 through a divider 418, 419, and fed to the monostable multivibrator 415 by way of a resistor 420 and a capacitor 421. In this manner, the monostable multivibrator 415 varies the duration of the pulses TP through the output wire 414 from a minimum $T_{min}$ (FIGS. 12 and 14) of about 6 μsec for example, to a maximum $T_{max}$ of about 12 μsec, to correspond to a maximum and minimum value respectively of the voltage across the capacitor 402. A diode 207 is connected in series with the secondary winding 206 to block the negative half waves of the discharge voltage of the arc generated between the ink bar 102 and the counter-electrode 89.

When a positive pulse ABAT reaches the base of the transistor 198, the transistor 198 becomes saturated and is traversed by a current $I_1$ which varies from zero to an instantaneous maximum of about 15A, while the voltage VC at its collector goes to zero for the entire duration of the pulse ABAT, to immediately rise afterwards to a peak value of about 300 V, assuming for example that the voltage VA when the transistor is blocked is 25 V D.C. Consequently, an oscillatory voltage U is induced in the secondary winding 206 which, starting from the moment of blockage of the transistor 198, rises to a peak of about 4000 V to fall to a value of about 300–400 V as soon as a discharge current $I_2$ circulates between the electrodes 102, 89 and remaining at this latter value for the duration of about 8 μsec, ie equal to the positive half period of the oscillation of the voltage U.

It is therefore clear that as soon as the threshold value of the transistor 198 is exceeded, a discharge takes place between the electrode 89 and the bar 102, which causes the dot to be printed. This discharge causes both the current $I_1$ and the voltage across the secondary of the transformer 200 to fall suddenly, and consequently the voltage between the electrode 89 and the bar 102 falls to zero and the emission of inked particles remains blocked, so that only one dot becomes printed.

Among many possible modifications, the printing element 100 can be replaced by an element which prints by means of a jet of liquid ink, for example.

We claim:

1. A serial dot printer for printing dots in a series of printing positions on a printing support along a printing line, comprising a carriage movable relative to said printing support and having a rectilinear guide perpendicular to the direction of carriage movement, at least one printing head selectively actuatable and mounted on said carriage, a driving member rotatable about a shaft perpendicular to said direction and to said guide for moving said carriage, said driving member including an eccentric element fixed thereon and engaged with said guide for moving said carriage with simple harmonic motion along the entire length of said printing line.

2. A printer as claimed in claim 1, wherein said driving member comprises a disc having on one face said eccentric element and having on the other face a cam element (71) arranged to move a counterweight (90) parallel to the movement of the carriage but in the opposite direction, so as to counteract the inertial forces of the mass of the carriage during the reversal of its movement.

3. A printer as claimed in claim 2, in which the printing support is a strip of paper, characterized in that the printing head is of the single printing element type, and moves along the entire length of the line of print.

4. A printer as claimed in claim 1, in which the printing head can be selectively operated by an operating circuit to print in a series of printing positions equidistant on said printing support under the control of means effecting synchronisation with the carriage movement, and wherein said synchronisation means comprise a disc rotatable at constant speed, rigidly connected to said driving element and provided with slots (258) spaced apart by a pitch which varies according to the variable speed of the carriage and a fixed optical transducer cooperating with said slots to generate a synchronisation signal.

5. A printer as in claim 1, wherein said printing head is a single ink jet head having a tubular container of insulted material for a rod of a conductive solid ink element the axis of said container being parallel to said rectilinear guide.

6. A printer as claimed in claim 1, wherein said support is carried by a cylindrical platen and said driving element carries a peripheral thread having a variable pitch to intermittently rotate a driven wheel connected with said platen, said platen advancing said support in direction perpendicular to said printing line during the return stroke of said carriage.

7. A printer as claimed in claim 6 comprising an one-way clutch for connecting said driven wheel and said platen, whereby the platen can be rocked by hand irrespective from said driven wheel.

8. A printer as claimed in claim 2, wherein said cam element is a circular cam recessed on the opposite face of said driving element cooperating with said counterweight and eccentrically arranged relative to said shaft in an angular position diametically opposite with respect to said eccentric element, whereby said counterweight counteracts the inertial forces of the mass of said carriage at the ends of its strokes.

* * * * *

UNITED STATES PATENT AND TRADEMARK OFFICE

CERTIFICATE OF CORRECTION

PATENT NO. : 4,428,693

DATED : January 31, 1984

INVENTOR(S) : Michele Bovio et al.

It is certified that error appears in the above-identified patent and that said Letters Patent is hereby corrected as shown below:

On the title page, Item /75/ should read

-- /75/ Inventors: Michele Bovio, Brosso; Pierangelo Berruti; Chivasso; Walter Gillone, Ivrea, all of Italy --.

Signed and Sealed this

*Ninth* Day of *April 1985*

[SEAL]

*Attest:*

DONALD J. QUIGG

*Attesting Officer* *Acting Commissioner of Patents and Trademarks*